Aug. 11, 1931.  A. LANGSNER  1,818,484
DEVELOPING APPARATUS
Filed Dec. 20, 1928   6 Sheets-Sheet 4
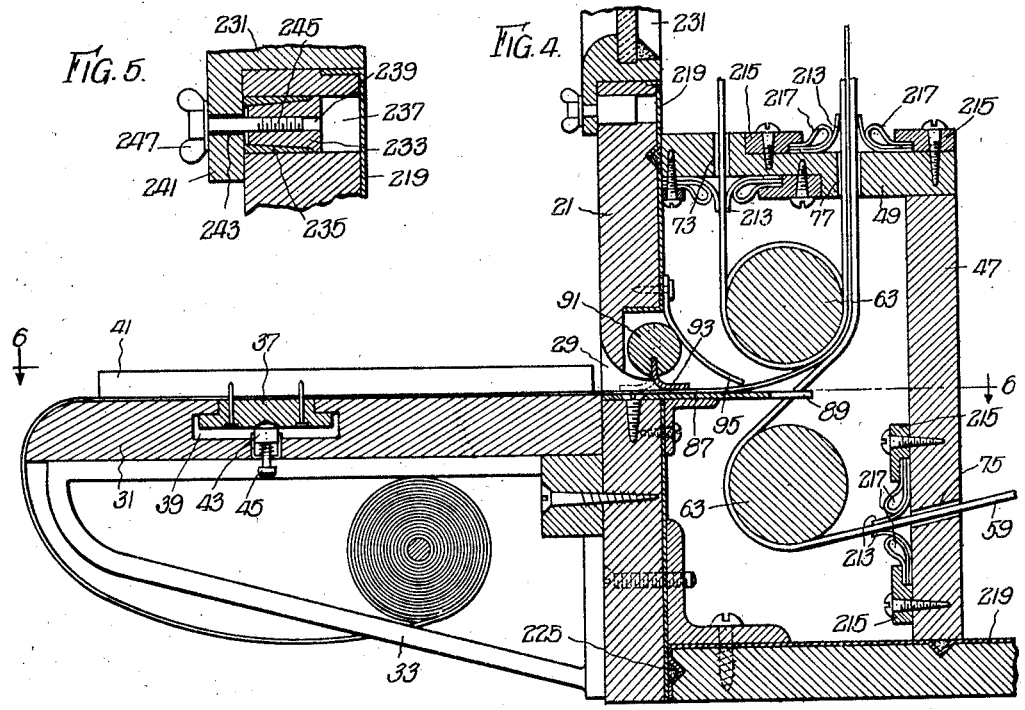
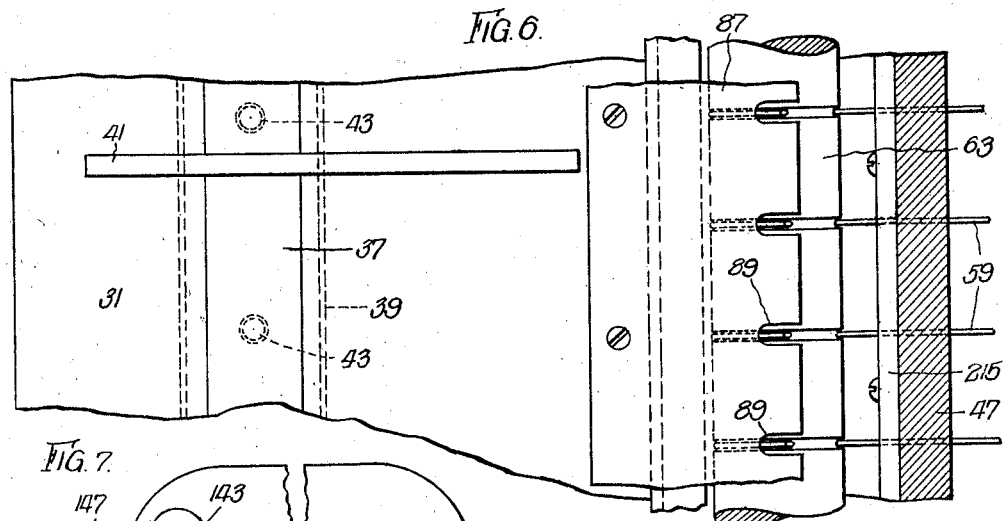
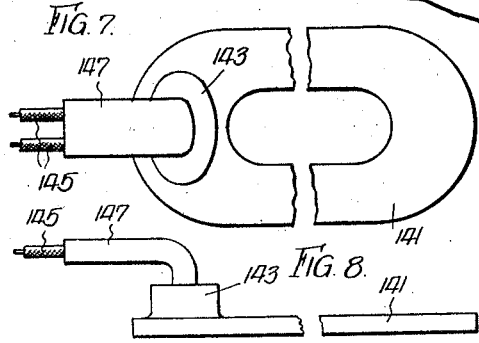
INVENTOR:
ADOLPH LANGSNER,
BY Cheever & Cox
ATTYS.

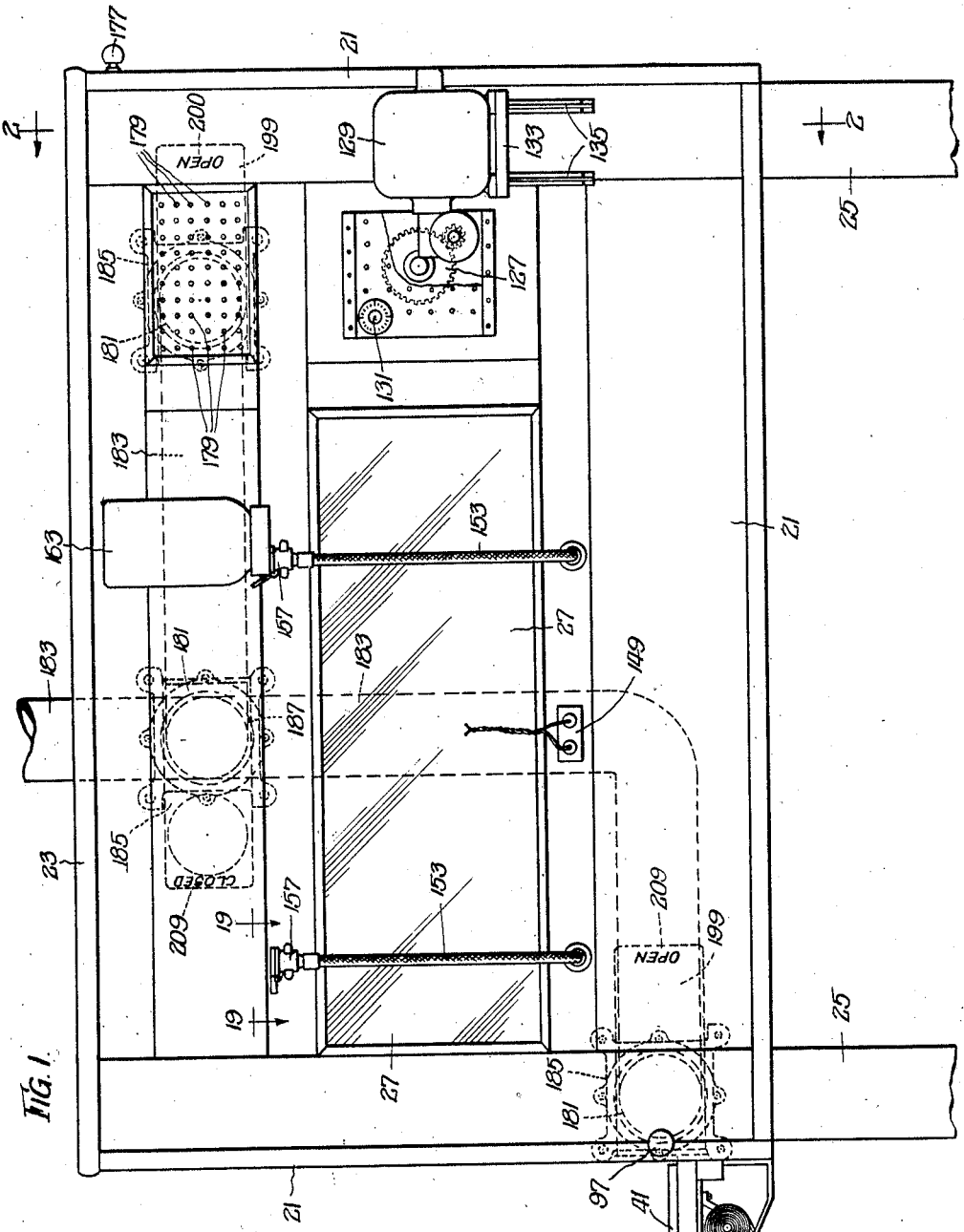

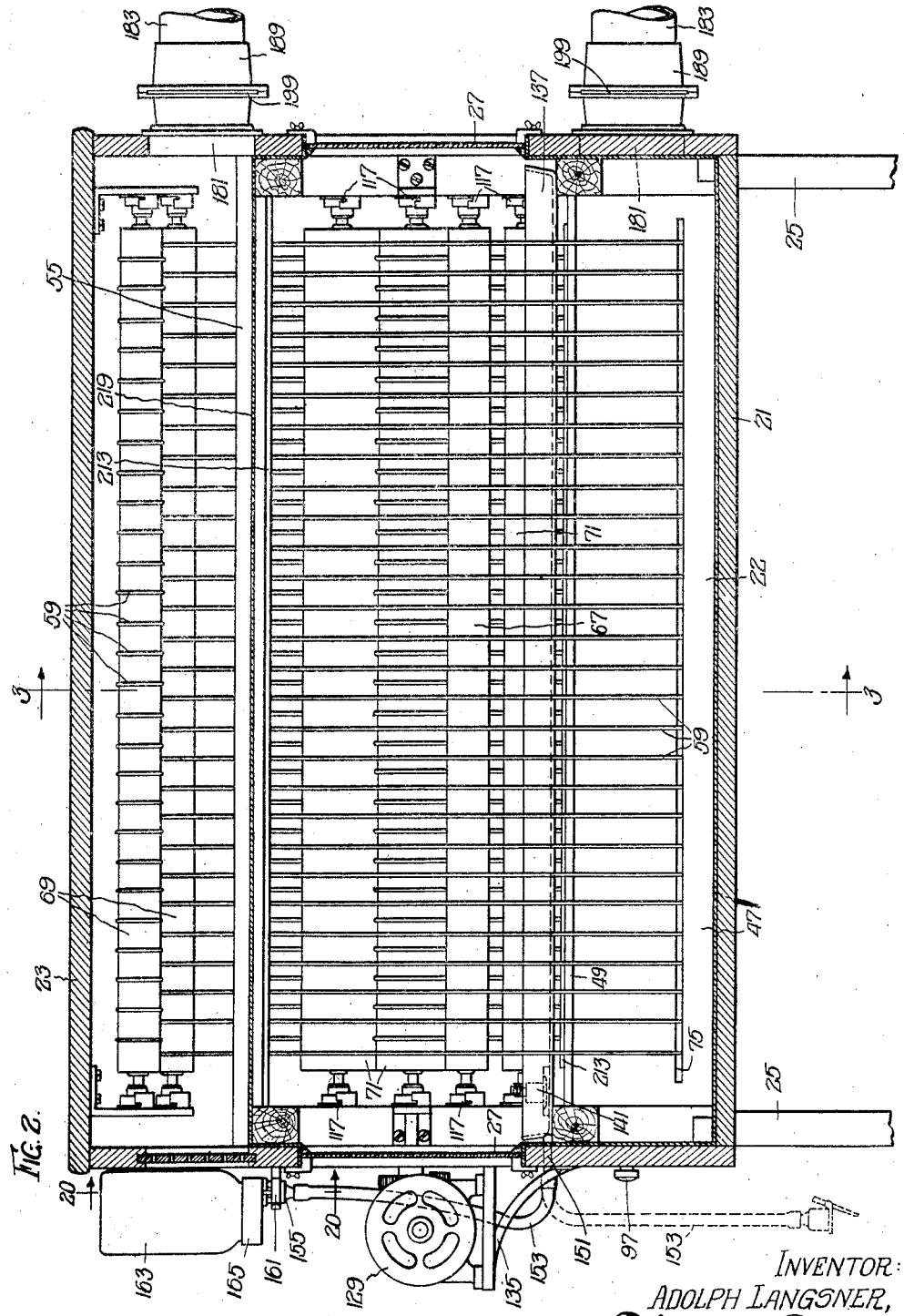

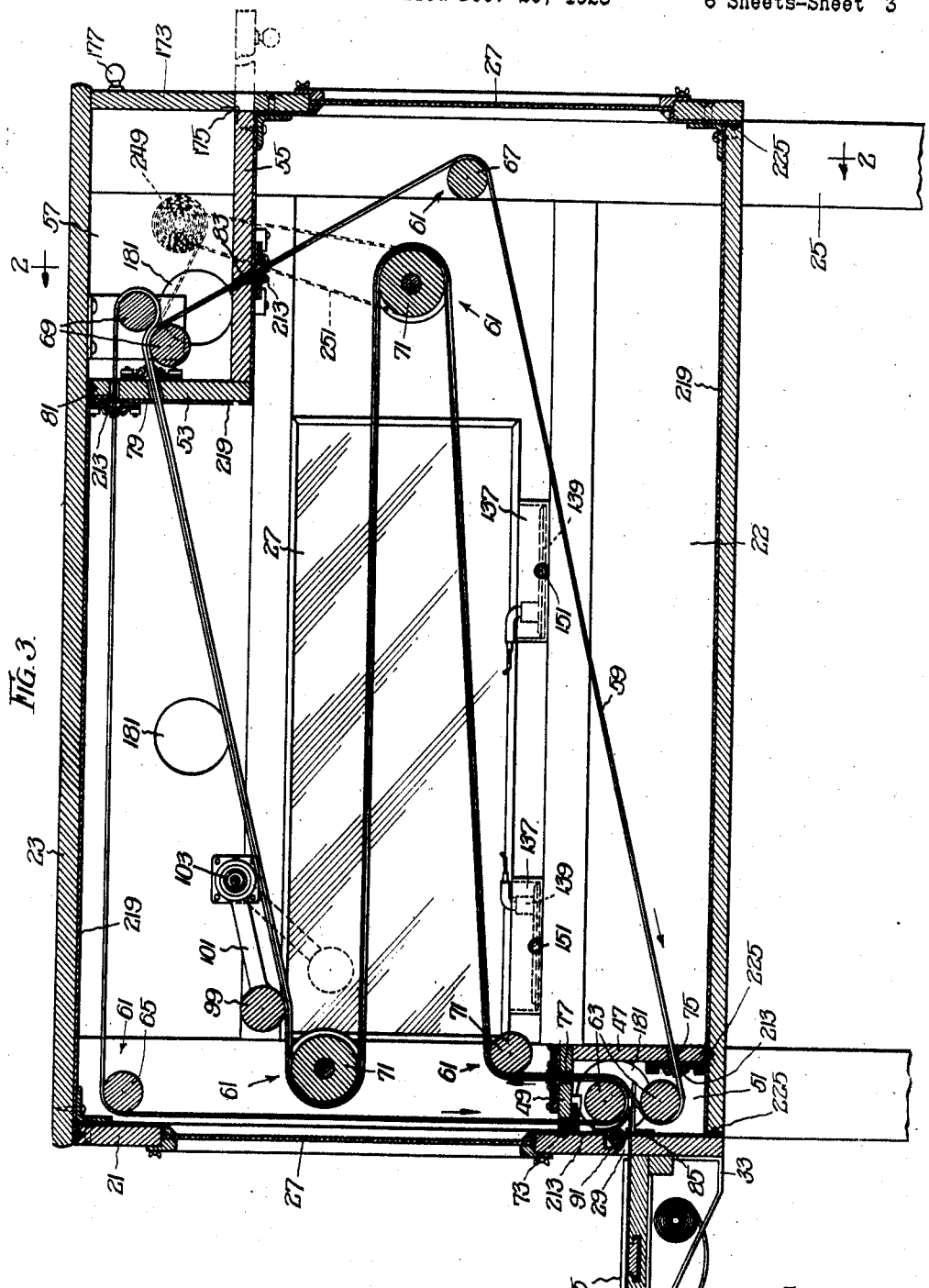

Aug. 11, 1931.   A. LANGSNER   1,818,484
DEVELOPING APPARATUS
Filed Dec. 20, 1928    6 Sheets-Sheet 5
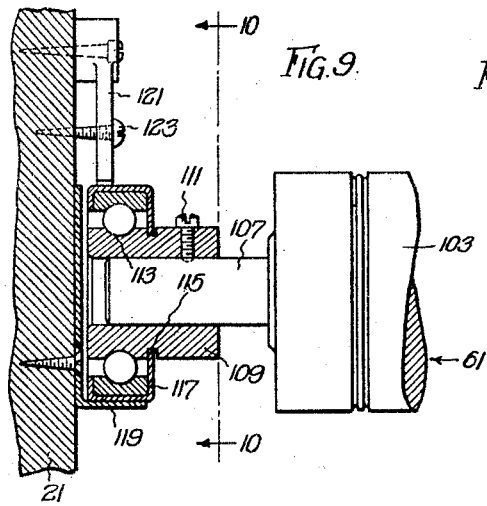
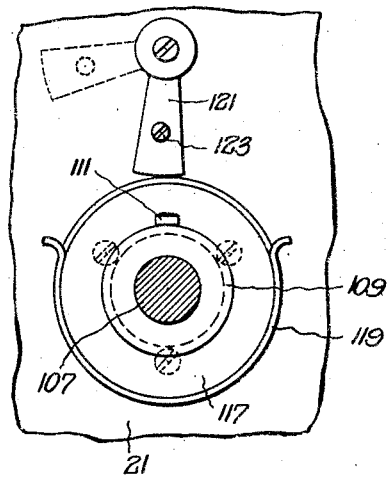
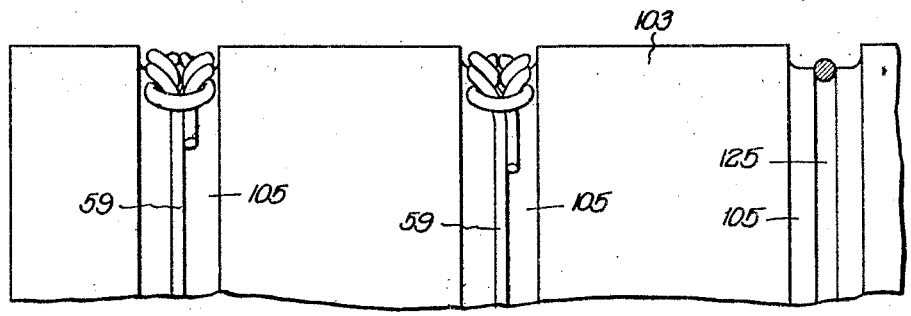
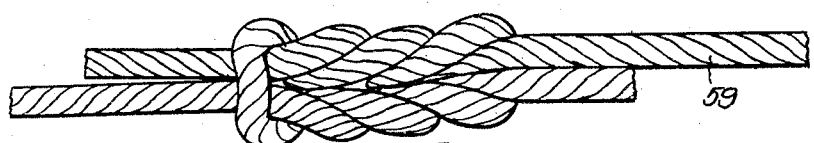
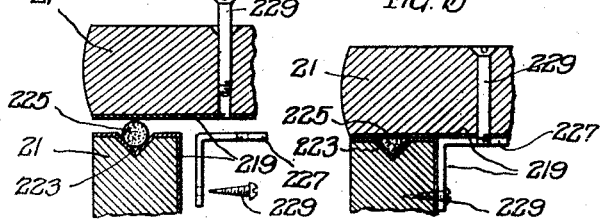
INVENTOR:
ADOLPH LANGSNER,
BY Cheever & Cox
ATTYS.

Aug. 11, 1931.  A. LANGSNER  1,818,484
DEVELOPING APPARATUS
Filed Dec. 20, 1928   6 Sheets-Sheet 6
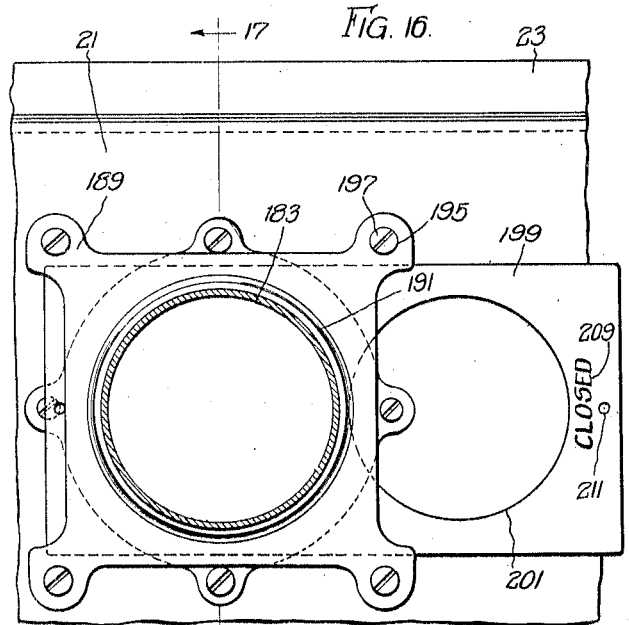
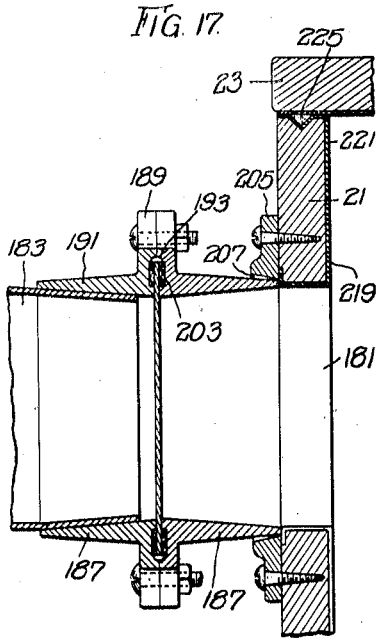
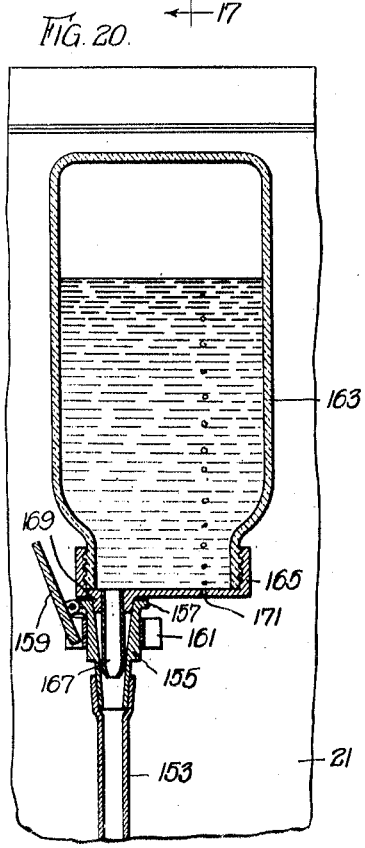
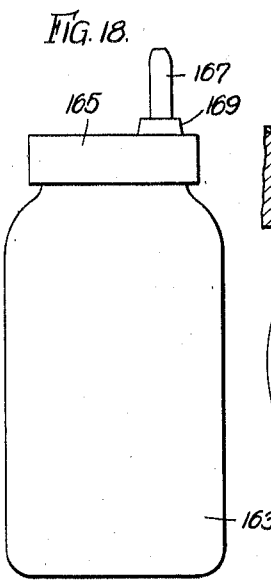
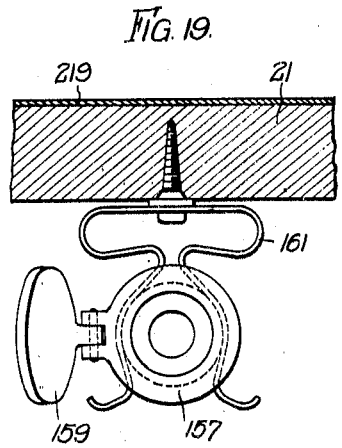
INVENTOR:
ADOLPH LANGSNER,
By Cheever & Cox
ATTYS Patented Aug. 11, 1931

1,818,484

UNITED STATES PATENT OFFICE

ADOLPH LANGSNER, OF CHICAGO, ILLINOIS, ASSIGNOR TO EUGENE DIETZGEN CO., OF CHICAGO, ILLINOIS, A CORPORATION OF DELAWARE

DEVELOPING APPARATUS

Application filed December 20, 1928. Serial No. 327,242.

My invention relates to developing apparatus for light sensitive material and has particular reference to apparatus for developing light sensitive sheets by the action of a gas such as ammonia, water vapor or any other gaseous developing agent.

One of the objects of my invention is to provide a neat and compact developing apparatus, comprising an air and gas tight chamber containing developing gases and completely enclosed conveyors for receiving and drawing light sensitive material through the chamber to develop the same, wherein the apparatus is arranged to occupy a minimum of space and has various novel features whereby the apparatus is safely sealed against the egress of noxious fumes, without sacrificing neatness and compactness of construction.

Another important object of my invention is to provide an apparatus for developing sheets of light sensitive material by the action of gaseous developing mediums wherein various elements cooperate to insure against the contamination of the air in the vicinity of the developing apparatus through the escape of the developing medium, the device embodying novel and improved means for fastening the parts of the cabinet together comprising anchor bolts; novel means for sealing the joints of the apparatus; a novel construction wherein a developing compartment is provided with sheathing over its inner faces to prevent the developing gases from penetrating the wood of the cabinet and so escaping, and also has internal partitions forming an anti-chamber through which the material may be fed into the developing chamber proper, and wherein an improved sealing gasket is provided for the slot, through which the light sensitive material is introduced into the anti-chamber whereby the chamber is effectively sealed against the escape of noxious fumes to the outer air while the passage of light sensitive material in either direction through the slot is permitted, means for exhausting the noxious developing gases from the anti-chamber is provided so that no fumes may escape into the surrounding atmosphere. A further object of the invention, in this connection, is to provide an improved connector for attaching an exhaust pipe to the developing apparatus, which connector is easy to assemble, is of simple and rugged construction, and is inexpensive to manufacture, and embodies means for controlling the exhaust from the chambers. A still further object is to provide a developing apparatus having means whereby the apparatus may be quickly and easily evacuated of all noxious fumes to permit repairs or other necessary operations to be performed upon the interior of the apparatus.

Another important object of my invention is to provide novel and improved means for sealing the openings through which light sensitive material may be fed into or withdrawn from the developing chamber of the apparatus of my invention, which sealing means will not hinder the ingress or egress of the light sensitive material but will effectively prevent the escape of the developing gases. A further object of the invention, in this connection, is to provide a guide for automatically aligning the light sensitive material as it is fed into the machine so that the same may not become jammed to thus cause stoppage of the apparatus and possible breakage of the feeding and sealing mechanisms. Another object is to provide a guide immediately inside the receiving aperture to cooperate with the conveyors within the chamber in order to direct the forward advancing edge of the light sensitive material into the proper path between the conveyors and to prevent the normally curling edge of the paper from curling up and becoming jammed.

Another important object of my invention is to provide, in a gas-proof developing apparatus, improved conveying means for drawing light sensitive material through the apparatus, which means is completely enclosed within the developing apparatus and which includes continuous strings carried on rollers, the strings being knotted with a preferred knot which will not injure the light sensitive material or the sealing means for the various apertures through which the light sensitive material is carried and the rollers being specially constructed to cooperate with the knotted strings to assist in the foregoing advantages, the rollers being formed with novel grooves adapted to receive the knotted strings in a manner eliminating all danger of breaking the strings and consequent stoppage of the machine, damage to the sealing means and escape of noxious fumes. As an added improvement, the rollers are provided with self aligning quickly detachable support bearings of novel construction whereby the rollers guide the strings in a true path at all times, thus preventing the apparatus from possible internal damage. In addition to this improvement, another object is to provide a compact means for driving the conveyors by directly connecting a roller to an electric motor which in turn is mounted to the frame of the developing apparatus. A further improvement resides in the provision of an automatic take up for the strings, by means of which the strings are continuously maintained in taut condition so as to properly handle light sensitive material.

Still another important object of my invention is to provide a novel gas tight apparatus particularly adapted for the developing of light sensitive material by the agency of dry heated ammonia vapor and/or water vapor and including pans within the developing apparatus for containing liquid developer and heaters of novel construction for heating the liquid in the pans to create the heated developing gases, an important object of the invention being to provide an apparatus wherein light sensitive material may be developed quickly and effectively in direct contact with the developer in gaseous form. Another important object, in this connection, is to provide a spout whereby pans within the apparatus for containing liquid developer may be filled or emptied from outside of the apparatus without contaminating the atmosphere and to provide a novel and improved container for use in connection with the filling spout whereby liquid may be transported to the spout and introduced into the apparatus therethrough without contaminating the surrounding atmosphere with noxious fumes. Another important object of the invention is to provide a developing apparatus comprising a square cabinet having partitions forming a developing chamber and a ventilated airing chamber into which developed sheets of light sensitive material may be expelled from the developing chamber for airing prior to being removed from the developing machine, the cabinet being aired by forced suction and having a door arranged to open in such a manner as to form a shelf on which the developed prints may be sorted.

Yet another object of my present invention is to provide means and arrangements whereby the developing apparatus is sealed against the escape of noxious gases, rendered compact in order to conserve space, the developing apparatus being provided with a flat top and so arranged as to be usable as a table and the like.

Numerous other objects and advantages will be apparent from the following description which, taken in connection with the accompanying drawings, discloses a preferred embodiment of the invention.

Referring to the drawings:

Figure 1 is a side elevation of a developing apparatus embodying my invention;

Figure 2 is a vertical cross section taken substantially along the line 2—2 in Figure 1;

Figure 3 is a vertical cross section taken substantially along the line 3—3 in Figure 2;

Figure 4 is an enlarged fragmentary view illustrating a portion of the apparatus shown in Figure 3;

Figure 5 is an enlarged fragmentary view partially in cross section showing a portion of the apparatus illustrated in Figure 4;

Figure 6 is a horizontal cross section taken substantially along the line 6—6 in Figure 4;

Figures 7 and 8 are respectively top and side elevations of a heater element adapted for use in the apparatus of my invention;

Figure 9 is a sectional view taken through a support bearing for rollers adapted for arrangement in the apparatus of my invention;

Figure 10 is a vertical cross section taken substantially along the line 10—10 in Figure 9;

Figure 11 is an enlarged fragmentary prospective view of the surface of the rollers adapted for arrangement in the apparatus of my invention showing grooves and cords in place therein;

Figures 12 and 13 are respectively top and side elevations of an improved knot for connecting the abutting ends of continuous cords adapted to run in grooves of the rollers in the apparatus of my invention;

Figures 14 and 15 comprise enlarged sectional views illustrating respectively the disassembled and assembled positions of the parts forming an improved seam embodied in the apparatus of my invention;

Figure 16 is a plan view of a valve for controlling a suction exhaust from the apparatus of my invention;

Figure 17 is a vertical cross section taken substantially along the line 17—17 in Figure 16;

Figure 18 is a perspective view illustrating an improved jar and cover therefor for introducing a liquid developing medium into the apparatus of my invention;

Figure 19 is a horizontal cross section taken substantially along the line 19—19 in Figure 1 to illustrate an inlet through which liquid developer may be introduced into the apparatus of my invention, the inlet being shown in open position; and Figure 20 is a vertical cross section taken substantially along the line 20—20 in Figure 2 to illustrate the jar of Figure 18 in position in the inlet of Figure 19 while introducing a liquid developer into the apparatus of my invention.

To illustrate my invention I have shown on the drawings a developing apparatus which comprises an enclosing cabinet 21 forming a developing chamber 22 which may be formed of any suitable material, preferably wood. The cabinet is provided with a flat top 23 and is mounted on suitable legs 25, the top 23 being supported at such a height that it may be used as a desk. One of the objects of my inventions is to provide an airtight gas-proof developing apparatus which will enable workers to move about and perform other duties in the close vicinity of the developing cabinet without fear of asphyxiation from escaping fumes, which enables me to arrange the enclosing cabinet 21 in such a manner that it may be used safely as a table or desk. The cabinet is preferably rectangular in shape and is provided with inspection windows 27 in its side walls. A source of developing gas is arranged within the cabinet and the cabinet is provided with various improvements for rendering it gas-tight and odorless. Means are also provided for conveying light sensitive material through the gases within the cabinet. These means are entirely enclosed within the cabinet.

The cabinet is provided in its forward wall with an elongated slot 29 through which light sensitive material may be inserted into the cabinet, and a platform 31 is arranged to the wall of the cabinet adjacent the slot 29 being supported in place by means of brackets 33. This platform may be used to support sheets of light sensitive material as they are fed through the slot, and is provided with a guide 35 to align the sheets of light sensitive material as they are fed into the slot in order that they may enter the cabinet in proper alignment. The construction of this guide is shown in detail in Figure 4 of the drawing and consists of a longitudinal slide 37 seated in a dovetailed groove 39 formed in the upper surface of the platform 31. The slide 37 carries a guide member 41 in position to move across the upper surface of the platform 31 when the slide 37 is moved axially in the groove 39 to thus provide an adjustable guiding surface across which a lateral edge of a sheet of light sensitive material may be engaged to align the sheet of light sensitive material as it is fed through the slot 29. Means 43 comprise a spring pressed button normally urged against the slide 37 to lock the same to the platform, is mounted in the bottom of the slot 39 and may be operated by means of a knob 45 protruding from the bottom face of the platform 39.

The cabinet is provided internally with a partition comprising a vertical wall 47 and a horizontal wall 49 forming a compartment 51 enclosing a space within the cabinet 21 immediately adjacent the inlet slot 29. I prefer to call this compartment a pre-developing chamber. As will be hereinafter more fully described, I provide means for ventilating the predeveloping chamber in order to create a zone of fresh air within the cabinet and around the inlet slot 29 whereby to prevent the escape of noxious fumes which may enter the predeveloping chamber from the developing chamber. The cabinet is provided with a second partition comprising a vertical wall 53 and a horizontal wall 55 arranged to define a receiving chamber 57 which I prefer to call the post-developing or degassing chamber. As will appear more fully hereinafter, I provide means for ventilating the degassing chamber so that the light sensitive material in passing out of the machine through the degassing chamber may be subjected to a column of fresh air whereby any noxious odors or fumes clinging to the paper may be removed before the same is ejected from the cabinet.

Light sensitive material may be introduced into the pre-developing chamber through the slot 29, and is carried thence into the developing chamber 22, through which it is conducted along a serpentine path for a sufficient time to enable the light sensitive material to be developed by a developing gas within the chamber 22. The material is then passed into the receiving chamber 57 in which it is degassed by exposure to a column of fresh air. The chamber 57 is provided with an opening through which the developed light sensitive material may be withdrawn or ejected from the apparatus. This discharge opening may be formed in any convenient manner, but I prefer to arrange a door 173 hinged along its lower edge as at 175 to the horizontal partition member 55. The door 173 is provided with a handle 177 whereby it may be opened, and the base of the door 173 is arranged to abut the end of the partition 155 when the door is in open position in order to support the same in the position illustrated in dotted lines in Figure 3 of the drawings, whereby the door may form a platform extending outwardly of the discharge opening of the chamber 57 on which the developed sheets of light sensitive material may be sorted conveniently. Means is provided within the cabinet for continuously feeding the light sensitive material introduced through the slot 29 through the machine, as heretofore described. In the present embodiment of my invention I prefer to use a plurality of sets of endless cords or belts 59 operating around a series of spaced guide rollers 61.

These cords and rollers and a preferred method of mounting the same within the cabinet are illustrated in Figures 9 to 13 inclusive. The rollers comprise a cylindrical member 103 provided with a plurality of spaced grooves 105. The rollers have stub shafts 107 extending from their opposed ends, whereby the rollers may be mounted to the walls of the cabinet. Each shaft 107 carries a bushing 109 secured thereto by any suitable fastening means such as the set screw 111. The bushing 109 is provided with an annular groove 113 in its exterior surface to provide a ball race and has a second annular groove 115 adapted to receive the edge of a bearing housing 117. The walls of the cabinet are provided with spring brackets 119 into which the housing 117 may be engaged by snapping the same between the spring walls of the bracket 119. A shiftable latch is provided to firmly secure the bearing housing 117 in place, the same comprising an arm 121 pivotally mounted to the cabinet wall immediately above the bracket 119. The arm may be swung upwardly to the dotted position shown in Figure 10 of the drawings to enable the bearing housing 117 to be assembled in the bracket 119. Thereafter the arm 121 may be swung downwardly to the locking position illustrated in full lines in Figure 10 and secured in place by means of a screw 123 engaging through an aperture formed in the arm and taking into the side wall of the cabinet to thus lock the bearing housing 117 in place. The bearing which I have illustrated may slip axially within the support bracket 119, thus permitting the rollers 103 to align themselves within the cabinet, it being understood that after the developing apparatus has been placed in operation the parts become heated through the creation of hot developing gases within the cabinet and a certain amount of expansion of the parts occurs. The bracket and bearing of my invention allow the roller to align itself within the compartment to compensate for such expansion, which fact prevents the parts from becoming warped or out of line and hence prevents light sensitive material from becoming jammed in the apparatus during operation with consequent shut-down or breakage, together with the escape of developing gases from the interior of the apparatus.

A major alignment of the roller 103 in its bearing may be accomplished by the adjustment of the set screw 101. The roller bearing and its support have the especial advantage of ready detachability, that is to say the roller may be easily demounted from its position within the cabinet for inspection or replacement, which feature reduces the time during which a machine may be shut down for repairs, it being possible to shut the machine down and replace a roller in a minimum of time, the windows 27 being demountable to provide entry into the developing chamber.

In the apparatus of my present invention, the conveyors 59 may be formed in any convenient manner, but I prefer to form the same of strings, and in order to secure the ends of a string to form a continuous conveyor, I prefer to employ a knot of the form illustrated in Figures 12 and 13 wherein the strings are wrapped around each other several times so that the resulting knot has a substantially flat formation. The grooves 105 of the roller are formed relatively wide in order to accommodate the width of these knots while in the center of the relatively wide grooves 105 I form a second groove 125 of a size adapted to receive the unknotted portion of the string. The guide rollers and cords are arranged to provide a tortuous path through the pre-developing chamber 51, the developing chamber 22 and the receiving chamber 57, and the arrangement is such as to provide a maximum course through the developing chamber 22 for the light sensitive material. In the preferred embodiment illustrated I provide two opposed rollers located opposite the inlet slot 29 and within the pre-developing chamber 51. Within the developing compartment 21 I arrange a guide roller 65 in the top of the cabinet and a similar guide roller 67 in the rear of the compartment. Similarly, I arrange a pair of opposed guide rollers 69 in the receiving compartment 57 and a plurality of spaced rollers 71 within the compartment 21. The strings 59 are arranged in two sets, the upper of which passes over the roller 65 and into the pre-developing chamber 51 through a slot 73 in the horizontal wall 49, while the lower set of strings passes around the roller 67 and into the pre-developing chamber 51 through a slot 75 formed in the vertical wall 47. Thereafter the strings pass around the rollers 63 and thence pass together out of the pre-developing chamber 51 into the developing chamber 22 through a slot 77 formed in the horizontal wall 49; thence together over the rollers 71 and through a slot 79 formed in the vertical wall 53 of the airing chamber. The strings then pass over the rollers 69 within the receiving chamber 57 and are separated, the strings of the upper series passing forwardly through a slot 81 formed in the vertical wall 53 and over the roller 65 and thence back to the rollers 63 at the inlet slot while the strings of the lower series pass downwardly through a slot 83 formed in the horizontal wall 55 and around a roller 67, thence back to the lower roller 63. In addition, I provide means for tensioning the endless cords. These means comprise a roller 99 carried on a swinging arm 101 which at its opposite end is pivoted in a bearing 103. The roller 99 is relatively heavy and is adapted to drop by gravity and bears downwardly upon the endless cords so as to give them the required tension as shown in dotted lines of Figure 3 of the drawings. In the illustrated embodiment I have shown but one such tensioning means wherein the roller 99 rests upon the stretch of strings of both series adjacent a roller 71. In this way, with a single device I am able to properly tension the strings of both series. It will be apparent, however, that the tensioning means may be arranged at any other convenient place within the cabinet or that a separate tensioning means may be arranged to operate upon the separate series of strings. The strings or cords 59 are made to travel through the cabinet by extending the shaft 107 of a roller 71 around which the strings of both series pass, through the wall of the cabinet and by connecting such extending end through a train of reduction gears 127 to a variable speed prime mover 129, which in the illustrated embodiment comprises an electric motor, the speed of which is controlled by means of a knob or handle 131 mounted to the outer walls of the developing cabinet. The motor 129 is supported from the walls of the cabinet by means of a suitable platform 133 and supporting brackets 135. It will be understood that the apparatus of my invention has as a principal advantage compactness and simplicity whereby the apparatus may occupy a minimum space and whereby all moving parts may be enclosed and whereby driving chains and the like for the several rollers may be entirely eliminated in order to reduce the possibility of shut-down due to breakage of the parts, it being understood that shut-down entails opening of the cabinet and consequent escape of poisonous or noxious developing gases into the air surrounding the cabinet.

A source of developing gas is provided within the developing chamber 22 in order to develop light sensitive material carried by the traveling cords through the cabinet. To this end pans 137 are provided. These pans may contain a suitable developing agent in liquid form and, although any suitable developer may be utilized, I contemplate the use of ammonia. Each pan is provided with a heater 139 for vaporizing the developer. These heaters may be of any convenient form, although I prefer to use electric heaters such as illustrated in Figure 7, comprising a substantially flat elongated heater portion 141, an integral bushing 143 through which lead wires 145 may extend to any convenient source of electric power. The bushing 143 is preferably filled with asbestos which is covered by any desirable substance which can not be affected by the developing medium, such as plaster of Paris or gypsum. A coupling terminal 147 is arranged to completely enclose the connecting wires 145 and may be formed either of soft or hard rubber. This coupling terminal is continued around the connecting wires within the cabinet up to an electric socket 149, as shown in Figure 1 of the drawing, located in the side walls of the cabinet in order to prevent the developing gases from attacking and corroding the connecting wires. It may be desirable to provide one pan with ammonia and another pan with water whereby upon operation of the heaters 139 ammonia fumes and heated water vapor may be evolved in the developing chamber 29, it being understood that dry ammonia fumes alone will accomplish developing but that the presence of moisture will increase the speed at which developing takes place.

In order to fill the pans 137 from outside of the cabinet, I provide at the bottom of each pan and directly in line therewith, a pipe 151 extending between the pan and a side of the cabinet and protruding therethrough, as shown in Figure 2 of the drawings, whereby to introduce or drain liquid developer from the pan 137. The protruding end of each pipe 151 is provided with a filling and emptying nozzle through which liquid ammonia may be introduced or withdrawn from the pans 137. This nozzle comprises a flexible tube 153 which may be comprised of rubber or similar flexible material which is not attacked by ammonia. One end of the rubber tube 153 is secured to the pipe 151, while the other is provided with a gravity cap closure 155. This cap closure is shown in detail in Figures 19 and 20 of the drawings and comprises a funnel shaped member 157 having a cap 159 pivoted to the rim of the funnel in position to fall across the open mouth thereof in order to close the same when the funnel is in normal upright position. The funnel is normally held in upright position by means of a spring clip 161 secured to the side walls of the cabinet above the top of the pan 137. In connection with the nozzle 155 I provide a novel ammonia container wherein a charge of ammonia for a pan 137 may be carried from storage to the developing apparatus and introduced through the filling nozzle into a pan 137 without permitting the escape of the developing gas into the atmosphere adjacent the developing cabinet. This container comprises a cylindrical open-mouthed bottle 163 having a cover 165 adapted for threaded engagement with the mouth of the bottle and provided with a nozzle 167 forming a channel through the cap 165 to permit the escape of ammonia from within the bottle. The cap 165 is formed with an integral boss 169 at the base of the nozzle 167, which boss is of a size to seat snugly within the peripheral rim of the funnel 155. The bottle 163 is filled with ammonia at the storage point and is immediately capped with the closure member 165. The operator may then carry the closed bottle to the developing apparatus, keeping a finger over the open end of the nozzle 167. The cover 159 may then be manipulated to uncover the funnel 157 and the bottle inverted and the nozzle 167 introduced into the funnel, the boss 169 seating snugly against the rim as shown in Figure 20 of the drawings. The cap 165 is provided with a small opening 171 which permits air to enter the bottle as the ammonia drains out through the nozzle 167. In this manner the pans 137 may be filled with ammonia without allowing any of the gas to escape into the air surrounding the developing apparatus. When the bottle has been emptied into the pan 137 it may be removed from the funnel 157 which is immediately closed by the cover 159.

The pans 137 are slightly tilted from back to front so that the forward end in which the tube 151 is formed is slightly lower than the rearmost end. When it is desired to drain the pans 137, the funnel 157 is detached from its supporting clip and allowed to assume the position illustrated in dotted lines in Figure 2 of the drawings. In this position the cover 159 automatically opens and the ammonia may be drawn off by gravity into any suitable receptacle placed beneath the funnel.

In order that the developing apparatus of my invention may be rendered proof against the escape of developing gases from within the developing chamber 22, I have provided the pre-developing chamber 51 and the receiving chamber 57 through which the light sensitive material is passed in entering and leaving the developing chamber proper. These chambers afford a check means whereby to prevent the escape of developing gases from the cabinet 21 through the inlet slot 29 and discharge opening of the airing chamber 57, that is to say the opening normally closed by the door 173. The chambers 51 and 57 provide means creating a ventilated zone within the cabinet and around the inlet and outlet openings thereof so that no gas may escape therethrough. To accomplish this the side walls of the chambers 51 and 57 are or may be provided with a plurality of perforations 179 as shown in Fig. 1 of the drawings, and each chamber is provided with an exhaust outlet 181 connected by means of suitable piping 183 to a vacuum exhauster such as an exhaust fan or pump. The developing chamber 22 also is provided with an exhaust outlet 181 which is connected to the vacuum exhauster for the purpose of reducing the pressure in the developing chamber and for the further purpose of quickly withdrawing the developing fumes from the chamber if and when the apparatus is opened up for inspection or repairs. These exhaust openings 181 are closed by shutter valves 185, the construction of which is illustrated in detail in Figures 17 and 18 of the drawings. These valves comprise a pair of couplings 187 having substantially square basal flanges 189 and cylindrical portions 191 extending upwardly of the basal flanges 189. These couplings are identical and are provided with a groove 193 in the lower face of the flanges 189 and are arranged to be secured together base to base, the flanges 189 being provided with bolt holes 195 through which bolts 197 may be arranged to secure the coupling together. A substantially rectangular shutter 199 having an opening 201 at one end and being imperforate at the other is arranged between the abutting flanges 189 of the couplings and is slidable therebetween. The shutter may be arranged in two positions in one of which the opening 201 is positioned between the couplings whereby the exhaust opening 181 of a chamber of the developing apparatus may be connected with the exhaust pipe 183 and in the other of which the imperforate portion of the shutter 199 is arranged between the couplings whereby to cut off the connection between an exhaust opening 181 and the suction pipe 183. In order to render the shutter more secure, I arrange gaskets 203 in the grooves 193 on either side of the edges of the shutter 199. The cylindrical portion 191 of a coupling may be secured to an exhaust opening 181 of a chamber of the developing cabinet by means of a collar 205 attached to the outer walls of the cabinet around the opening 181, the upper portions of the coupling being seated in the collar and secured thereto by means of cement 207 or other suitable means for sealing the coupling to the collar. The cylindrical portion of the remaining coupling of the pair is secured in any convenient manner to the exhaust pipe 183. If desired, indicia 209 may be formed in the opposed ends of the shutters 201 to indicate whether the shutters are in open or closed position. The shutters also are provided with short pins 211 at opposite ends in order to limit the movement of the shutter between the couplings 187. It will be apparent that the shutter construction which I have described is of the utmost simplicity and that the various parts may be manufactured at a minimum cost. The provision of indentical coupling members between which the shutter 199 may be arranged is also of advantage from a manufacturing standpoint.

By providing means for connecting the various compartments of the developing cabinet of my invention to a suction exhauster, the pre-developing chamber and the receiving chamber may be continuously evacuated of noxious gases whereby any gas which may enter these compartments through the walls 47, 49, 53 or 55 may be immediately removed through an exhaust outlet 181 whereby to thus prevent the possible escape of such gas through the inlet opening 29 or the discharge opening of the airing chamber 57. The perforations 179 in the side wall of the chamber 57 also insure that the atmosphere therein will be continuously freshened to the end that the developed light sensitive material may be properly aired before removal from the developing apparatus.

Means is provided for facilitating the intake and also the withdrawal of light sensitive material through the intake slot 29. Within the pre-developing chamber 51 a substantially L-shaped bracket 85 is secured to the forward wall of the cabinet immediately below the slot 29 and has an arm extending inwardly of the slot and having an upper arm 87. The inner edge of the upper arm 87 extends inwardly beyond the strings 59 of the lower series and is slotted as at 89 to allow the same to pass without scraping over the edge. It will be apparent that as the light sensitive material is fed in through the slot 29 that the arm 87 of the bracket 85 will support the light sensitive material until its forward edge is gripped by the strings of the lower series and carried around the upper roller 63, thus preventing the paper from curling downwardly and becoming jammed around the lower roller 63 in the pre-developing chamber 51. Means is also provided for sealing the infeed slot 29 in such a manner that the light sensitive material may be inserted or withdrawn through the slot 29 without disturbing the efficiency of the sealing means. To this end a rotatable roll 91 is arranged in the wall of the cabinet at the upper edge of the slot 29. This roll is provided with a longitudinal slot in which is secured a flexible gasket 93. A gasket 95 also is secured to the cabinet wall and extends to overlie the periphery of the roll in order to seal the space between the roll and the cabinet wall. The roll 91 may be rotated by means of a crank or handle 97 located outside the cabinet. When it is desired to feed light sensitive material through the opening 29, the roll is turned to the position shown in Figure 4 of the drawings wherein the free edge of the gasket 93 extends inwardly. When the light sensitve material is passed through the slot it will readily slide between the free edge of the flexible gasket and the lower edge of the slot but the engagement of the gasket with the lower edge of the slot will prevent the escape of developing gas within the cabinet through the slot. If it is desired to withdraw light sensitive material partially introduced through the slot, it is only necessary to operate the handle 97 to rotate the roll until the free edge of the gasket 93 extends outwardly as shown in dotted lines, Figure 4. This will permit the light sensitive material to be easily withdrawn through the slot 29 between the lower edge thereof and the flexible edge of the gasket, which will nevertheless prevent the escape of gases through the slot 29. The gasket 95 is extended beyond the roller 91 and has a free edge disposed adjacent the upper surface of the guide member 87 in position to direct light sensitive material between the cords of the cooperating sets of the conveyors and to prevent the light sensitive material from curling upwardly after insertion through the inlet slot 29 and becoming jammed between the upper roll 63 and the front wall of the cabinet. This arrangement is clearly illustrated in Figure 4 of the drawings.

To assist in rendering the developing cabinet of my invention gastight and odorless and to prevent the escape of developing gases into the atmosphere around the cabinet, I provide novel means for sealing the openings 73, 75, 77, 79, 81 and 83 through which the strings 59 pass in traveling from compartment to compartment within the developing cabinet. These sealing means are arranged to provide a gastight seal whereby to prevent the passage of gas through the openings aforesaid while permitting free passage of the strings 59 and the light sensitive material. The sealing means is illustrated in detail in Figure 4 of the drawings and comprises a pair of oppositely extending flexible gaskets 213 mounted on opposite sides of a slot through which the strings extend by means of fastening blocks 215 arranged to secure one edge of a gasket to the partition in which the slot is formed. The free edges of the gaskets 213 have lapping engagement and extend outwardly of the partition in the direction in which the string travels through the slot. Each gasket 213 is backed up by a folded resilient gasket forming a loop 217 whereby to resiliently urge the free edges of the gaskets 213 toward each other whereby they may the better engage the strings 213. It will be apparent that as the strings pass between the free edges of the opposed gaskets, that the same will allow the strings to pass freely while substantially preventing the escape of developing gas therebetween. In this manner the escape of developing gas from the developing chamber 22 into the predeveloping chamber 51 and the airing chamber 57 is prevented, while any gas which may pass the sealing gaskets 213 is removed immediately from the compartment through the exhaust outlets 181, escape of developing gas through the infeed slot 29 being prohibited by the flexible sealing gasket 93.

A further improvement which I have provided in the developing apparatus of my invention is the provision of a metallic sheathing 219 which is formed preferably of lead foil arranged as a facing for all surfaces of the developing cabinet which may come in contact with the developing gases. I prefer to form the developing cabinet of wood for the reason that such construction provides a sightly external appearance for the developing cabinet. Wood, however, is not impervious to developing gases, particularly ammonia, and it is therefore desirable to surface the inner walls of the developing cabinet with a gasproof sheathing. The sheathing 219 is carried around the edges of the opening 181 in the developing cabinet 22, being secured to the wall of the cabinet by the collar 205 by which the shutter construction 185 is secured to the opening. The sheathing also is carried around all the joints of the cabinet as at 221 in Figures 4 and 19 of the drawings. At the joints of the various members forming the side walls of the cabinet, I provide a novel seal which is illustrated in detail in Figures 14 and 15 of the drawings. I form longitudinal grooves 223 in the edges of the members to be joined and carry such sheathing into the grooves. In the groove I arrange a strip 225 of rubber or similar resilient material, the strip being circular in cross section. The sheathing of the abutting member is also extended to overlap the groove in the adjacent member and when the parts are drawn up tight by the fastening means illustrated as an angle iron 227 and screws 229, the gasket 225 is forced into the triangular groove and assumes the triangular cross section illustrated in Figure 15 of the drawings, thus providing a firm gasproof joint between the adjacent members of the cabinet.

The developing chamber 22 is provided with windows 27 at convenient points. These windows are mounted in frames 231 which are detachably held in position by means of the fastening arrangement illustrated in Figure 5 of the drawings. These windows serve two purposes. They permit an operator to view the interior of the cabinet to see if any obstruction or interference occurs during the feeding of the paper therethrough and also permit the removal of such obstruction should it occur and furthermore provide access to the interior of the developing cabinet through which the detachable rollers may be removed and replaced when repairs are needed. Since the outer walls of the cabinet are preferably formed of wood and since these windows may have to be removed at frequent intervals, it is not practical to provide wood screws for fastening the window frames in place for the reason that continued insertion and removal of the wood screws into the walls of the cabinet will form enlarged holes in which the screws sooner or later will not properly engage to screw the window frame to the cabinet. I have, therefore, provided the fastening construction illustrated which comprises a wedge shaped bushing 233 which detachably engages a corresponding wedge shaped seat 235 which is arranged in a socket 237 formed in the walls of the cabinet adjacent the window frame. The bushing 233 is provided with a threaded longitudinal bore 239 and the window frame is provided with a flanged portion 241 adapted to overlie the bushing 233. This flange is provided with an aperture 243 so positioned that it aligns with the threaded bore 239 of the bushing when the window frame is in place. A threaded bolt 245 having a butterfly head 247 to permit manual manipulation of the bolt is provided to take through the aperture 243 and threaded engagement in the socket 239 of the bushing 233. When the bolt 245 is drawn up tight, the bushing 233 is drawn into a wedge shaped seat 235 and constantly tightens itself in the wood of the frame. With this construction, no matter how often the glass frame is removed, the screws will always provide a gas tight seal for the window frame.

It will be apparent that, in the operation of my improved developing apparatus, when a sheet or continuous strip of light sensitive material is inserted through the opening 29, and beneath the gasket 93, it will be passed by the deflector or guide members 87 and 88 directly between the opposed series of strings within the pre-developing chamber 51, which chamber is maintained in substantial gas-free condition by the normal operation of the suction exhauster through the opening 181. Thence the light sensitive material will pass around the uppermost of the guide rollers 63, through the slot 77 and into the developing chamber 22. The opposed series of conveyors are arranged to carry the light sensitive material in a tortuous path around the rollers 71 within the developing chamber, and conveyors being arranged to carry the light sensitive material along a path of maximum length within the developing chamber. The sources of developing gas, comprising the pans 137 of ammonia and the heaters 139, provide hot developing gas around the light sensitive material as it passes through the developing compartment. After remaining in the atmosphere of the developing compartment a certain time to permit development of the light sensitive material, which time is controlled by regulating the speed of the motor 129 by means of the hand control 131, the light sensitive material is carried by the conveyors into the receiving compartment 57 where it is discharged from the conveyors. The receiving compartment is continuously ventilating through an exhaust outlet 181 and the developed light sensitive material may remain in the compartment sufficiently long to permit the removal of all traces of the developing gas before it is removed. The developed light sensitive material may be deposited into the receiving compartment in sheets as developed or, if a continuous strip is being treated, the same may be rolled up within the receiving compartment by any suitable mechanism, such as a roller 249 driven by any suitable means such as the belt or chain 251 extending from the driven roller 71. While the light sensitive material remains in the compartment 57 it is subjected to the action of air drawn through the apertures 179. During the operation of the developing apparatus, the possibility of the escape of gas is reduced to a minimum because of the various features which are combined in this device. The inlet opening 29 and the discharge opening of the receiving chamber 57 are isolated from the developing chamber 22 by means of the partitions 47, 49, 53 and 55 and provide means for isolating a zone of fresh air at and around said openings. These partitions are sealed by novel applications of the sealing gaskets 213 and in addition any gas which may enter the pre-developing and airing chambers from the developing chamber 22 is immediately exhausted through the openings 181 to the end that no ammonia fumes may escape. The seams of the developing apparatus are formed in a novel manner whereby to prevent the escape of developing gas therethrough. In addition, the inlet aperture 29 is provided with a novel two-way sealing member which permits the introduction or withdrawal of light sensitive material through the slot while preventing the escape of any gases therethrough. A further advantage resides in the novel manner of securing the detachable windows in place whereby continual removal and replacement of the windows will not effect the security of the fastening means whereby the same are secured in place.

Another important advantage of the invention resides in the provision of novel self aligning bearings for the rollers 61 whereby the same may align themselves within the compartment to accommodate for the expansion and contraction of the parts in operation. Various other features contribute to the odorless and gasproof nature of my apparatus. These means include the guide bracket at the infeed slot whereby material is prevented from becoming jammed around the lower roller 63, the tension roller 99 whereby the cords are maintained in uniform tension and the novel means for filling and emptying the pans 137 from outside of the apparatus while preventing the escape of developing fumes into the air.

It is thought that the invention and numerous of its attendant advantages will be understood from the foregoing description and it is obvious that numerous changes may be made in the form, construction and arrangement of the various parts without departing from the spirit and scope of th invention or sacrificing any of its attendant advantages, the form hereinbefore described being merely of a preferred embodiment for the purpose of illustrating my invention, and although I have shown, in detail, every feature of my improved apparatus and claim herein only the more detailed features of my invention, I do not thereby intend to disclaim the broader features of my invention, which are set forth and claimed in my earlier applications as follows: Serial No. 240,157, filed 12/15/27, for anhydrous printing and developing machine; Serial No. 248,745, filed 1/23/28, for developing apparatus; Serial No. 253,558, filed 2/11/28, for developing apparatus; Serial No. 282,792, filed 6/4/28, for developing apparatus; Serial No. 288,868, filed 6/28/28, for developing apparatus; Serial No. 304,773, filed 9/10/28, for developing apparatus, certain of which have been involved in interference proceedings.

Having thus described my invention, what I claim as new and desire to secure by Letters Patent is:

1. A developing apparatus for light sensitive material comprising a cabinet, having an opening for the insertion of light sensitive material into the cabinet, means for creating an atmosphere of a developing medium within the cabinet, an impervious sheathing covering the inner surface of the cabinet walls and means comprising a compressed gasket of resilient material arranged in the seams of the cabinet whereby to prevent the escape of the developing gas therethrough.

2. A developing apparatus for light sensitive material comprising a cabinet, having an opening for the insertion of light sensitive material into the cabinet, means for creating an atmosphere of a developing medium within the cabinet, an impervious sheathing covering the inner surface of the cabinet walls, means comprising a compressed strip of resilient material of circular cross section arranged in triangular grooves formed in the abutting edges of the cabinet walls at the seams thereof whereby to prevent the escape of the developing medium through the seams.

3. A developing apparatus for light sensitive material comprising a cabinet, having an opening for the insertion of light sensitive material into the cabinet, means for creating an atmosphere of a developing medium within the cabinet, means comprising an impervious sheathing formed and arranged to the inner walls of the cabinet for preventing the developing medium from penetrating the cabinet walls and thus escaping into the atmosphere surrounding the cabinet, said cabinet having grooves formed in the abutting edges of its side walls, and a gasket of resilient material compressed into said grooves, the edges of the impervious sheathing extending across and into said grooves.

4. A developing apparatus for light sensitive material comprising a cabinet provided with an aperture for the insertion of light sensitive material into the cabinet, means for creating an atmosphere of a developing medium within the cabinet and means comprising a compressed gasket of resilient material arranged in the seams of the cabinet whereby to prevent the escape of the developing gas therethrough and means comprising an impervious sheathing formed and arranged to the inner walls of the cabinet for preventing the developing medium from penetrating the cabinet walls and thus escaping into the atmosphere surrounding the cabinet.

5. A developing apparatus for light sensitive material comprising a cabinet provided with an aperture for the insertion of light sensitive material into the cabinet, means for creating an atmosphere of a developing medium within the cabinet, means comprising a compressed strip of resilient material of circular cross section arranged in triangular grooves formed in the abutting edges of the cabinet walls at the seams thereof whereby to prevent the escape of the developing medium through the seams and means comprising an impervious sheathing formed and arranged to the inner walls of the cabinet for preventing the developing medium from penetrating the cabinet walls and thus escaping into the atmosphere surrounding the cabinet, said sheathing extending around the edges of the walls of the cabinet and into said triangular grooves beneath the rubber gasket.

6. A developing apparatus for light sensitive material comprising a cabinet provided with an aperture for the insertion of light sensitive material into the cabinet, means in said cabinet forming a source of developing gas, a shiftable member mounted in said aperture, a flexible gasket carried by said member in position to snugly engage an opposed wall of the aperture and means for shifting said member to permit the gasket to extend in opposed directions whereby light sensitive material may be inserted into or withdrawn from the cabinet through the aperture while the escape of developing medium is substantially prevented, and means comprising a compressed gasket of resilient material arranged in the seams of the cabinet whereby to prevent the escape of the developing gas therethrough.

7. A developing apparatus for light sensitive material comprising a cabinet provided with an aperture for the insertion of light sensitive material into the cabinet, means in said cabinet forming a source of developing gas, a shiftable member mounted in said aperture, a flexible gasket carried by said member in position to snugly engage an opposed wall of the aperture and means for shifting said member to permit the gasket to extend in opposed directions whereby light sensitive material may be inserted into or withdrawn from the cabinet through the aperture while the escape of developing medium is substantially prevented, means comprising a compressed rubber gasket arranged in the seams of the cabinet whereby to prevent the escape of the developing gas therethrough and means comprising an impervious sheathing formed and arranged to the inner walls of the cabinet for preventing the developing medium from penetrating the cabinet walls and thus escape into the atmosphere surrounding the cabinet.

8. A developing apparatus for light sensitive material comprising a cabinet having a slot for the introduction of light sensitive material into the cabinet, means for creating an atmosphere of developing medium within the cabinet, means formed and arranged in the cabinet for preventing the escape of the developing medium and means formed and arranged within the cabinet for receiving light sensitive material introduced through the inlet slot and carrying the same along a devious path through the cabinet, said means comprising rollers arranged within the cabinet and endless conveyors carried by the rollers, said rollers having bearings formed in their opposed ends, bearing supports mounted to the walls of the cabinet in position to detachably receive the said bearings whereby to position the rollers in desired position within the cabinet.

9. A developing apparatus for light sensitive material comprising a cabinet having a slot for the introduction of light sensitive material into the cabinet, means for creating an atmosphere of developing medium within the cabinet, means formed and arranged in the cabinet for preventing the escape of the developing medium and means formed and arranged within the cabinet for receiving light sensitive material introduced through the inlet slot and carrying the same along a devious path through the cabinet, said means comprising rollers arranged within the cabinet and endless conveyors carried by the rollers, said rollers having bearings formed in their opposed ends, bearing supports mounted to the walls of the cabinet in position to detachably receive the said bearings whereby to position the rollers in desired position within the cabinet, said bearings being axially slidable within the bearing supports whereby the roller may align itself in position within the cabinet.

10. A developing apparatus for light sensitive material comprising a cabinet having a slot for the introduction of light sensitive material into the cabinet, means for creating an atmosphere of developing medium within the cabinet, means formed and arranged in the cabinet for preventing the escape of the developing medium and means formed and arranged within the cabinet for receiving light sensitive material introduced through the inlet slot and carrying the same along a devious path through the cabinet, said means comprising rollers arranged within the cabinet and endless conveyors carried by the rollers, said rollers having bearings formed in their opposed ends, bearing supports mounted to the walls of the cabinet in position to detachably receive the said bearings whereby to position the rollers in desired position within the cabinet, and means for latching the bearings in the bearing supports.

11. In a device of the class described, the combination of a cabinet having an entrance slot in a wall, a partition within said cabinet arranged adjacent said slot and having a branch extending across said cabinet to an adjacent wall to provide an isolated developing chamber and an airing chamber, said airing chamber communicating with said entrance slot, an exhauster for the airing chamber and a source of ammonia gas for the developing chamber, guide rolls in said chambers and endless cords passing around said guide rolls and through slots in the partition members, flexible gaskets for said slots constructed and arranged to permit the passage of the cords and paper therethrough while preventing the escape of the gas therethrough.

12. A developing apparatus for light sensitive material comprising a cabinet provided with a slot for the insertion of light sensitive material into the cabinet, means in said cabinet forming a source of developing gas, a shiftable member mounted in said slot, a flexible gasket carried by said member in position to snugly engage an opposed wall of the slot and means for shifting said member to permit the gasket to extend in opposed directions whereby light sensitive material may be inserted into or withdrawn from the cabinet through the slot while the escape of developing medium is substantially prevented.

13. In a device of the class described, the combination with a gas-tight cabinet adapted to contain gases for the developing of light sensitive material and provided with an aperture for the insertion of light sensitive material into the cabinet, and a support member mounted at one edge of said aperture, an outwardly extending flexible gasket carried by said member in position to engage the opposed wall of said aperture and a manually operable member for shifting said support member to cause opposed sides of said gasket to engage said opposed wall of the aperture whereby to permit light sensitive material to be inserted into or withdrawn from said cabinet between said opposed wall and the side of said gasket engaging said opposed wall while preventing the escape of developing gas from the cabinet, and a flexible gasket secured to the side walls of the cabinet adjacent said slot and having a free edge engaging the shiftable member whereby to seal the opening between said member and the edge of the aperture along which the same is mounted.

14. In a device of the class described, the combination of a cabinet having a partition forming a developing chamber and an airing chamber, each of said chambers having an outlet connected to a suction exhauster, a source of developing gas for said developing chamber, said airing chamber having the wall opposed to the exhaust outlet provided with a series of perforations substantially coextensive with the area of the airing chamber whereby a current of air may be drawn through the airing chamber and out through the exhaust outlet, and means for passing light sensitive material through the developing chamber and through the airing chamber.

In witness whereof, I have hereunto subscribed my name.

ADOLPH LANGSNER.